(12) United States Patent
Reddy

(10) Patent No.: US 7,235,179 B2
(45) Date of Patent: Jun. 26, 2007

(54) METHOD FOR REMOVING ARSENIC FROM WATER

(75) Inventor: Katta Jayaram Reddy, Laramie, WY (US)

(73) Assignee: University of Wyoming, Laramie, WY (US)

( * ) Notice: Subject to any disclaimer, the term of this patent is extended or adjusted under 35 U.S.C. 154(b) by 0 days.

(21) Appl. No.: 11/124,951

(22) Filed: May 9, 2005

(65) Prior Publication Data

US 2006/0249460 A1   Nov. 9, 2006

(51) Int. Cl.
*C02F 1/28* (2006.01)
(52) U.S. Cl. .................. 210/670; 210/681; 210/911
(58) Field of Classification Search ............ 210/670, 210/911, 681
See application file for complete search history.

(56) References Cited

U.S. PATENT DOCUMENTS

| 4,913,808 | A |   | 4/1990 | Haque |
| 5,137,640 | A | * | 8/1992 | Poncha ............... 210/724 |
| 5,149,437 | A |   | 9/1992 | Wilkinson et al. |
| 5,348,662 | A | * | 9/1994 | Yen et al. ............ 210/717 |
| 5,556,545 | A | * | 9/1996 | Volchek et al. ....... 210/651 |
| 6,197,193 | B1 |  | 3/2001 | Archer |
| 2001/0051103 | A1 | | 12/2001 | Seo et al. |

FOREIGN PATENT DOCUMENTS

WO   PCT/US04/030491   3/2005

\* cited by examiner

*Primary Examiner*—Ivars C. Cintins
(74) *Attorney, Agent, or Firm*—Coats & Bennett, P.L.L.C.

(57) ABSTRACT

The present invention relates to methods for the rejuvenation of cupric oxide having adsorbed arsenic from arsenic contaminated water. The rejuvenated cupric oxide may be recycled to again react with and adsorb arsenic in arsenic contaminated water.

18 Claims, 2 Drawing Sheets

METHOD FOR REMOVING ARSENIC FROM WATER

BACKGROUND

Arsenic contaminates many aquifer systems worldwide and is commonly detected in ground water at concentrations exceeding current drinking water maximum contaminant levels. Arsenic is associated with a number of adverse effects on human health and is considered to be a human carcinogen.

Arsenic is a redox-sensitive element. As a result, arsenic may be present in a variety of redox states. In most aquifer and ground water systems having arsenic (As), the arsenic species are generally present as arsenate ($As^{5+}$) or arsenite ($As^{3+}$).

SUMMARY

The present invention relates to methods for the rejuvenation of cupric oxide having adsorbed arsenic from arsenic contaminated water. The rejuvenated cupric oxide may be recycled to react with and adsorb arsenic in arsenic contaminated water.

In one process cupric oxide having adsorbed arsenic is rejuvenated by reacting the cupric oxide having adsorbed arsenic with a strong base such as sodium hydroxide to desorb the arsenic from the cupric oxide. The cupric oxide is then separated from the strong base and arsenic and re-equilibrated for recycling.

In another process cupric oxide is reacted with arsenic contaminated water. The arsenic adsorbs to the cupric oxide. The cupric oxide having adsorbed arsenic is then separated from the water and reacted with a strong base to desorb the arsenic from the cupric oxide. The cupric oxide is then separated from the strong base and arsenic and re-equilibrated for recycling.

DETAILED DESCRIPTION

The present invention relates to processes for the rejuvenation of cupric oxide having adsorbed arsenic from water. The term arsenic is used broadly herein to define all redox states of arsenic such as arsenite ($As^{3+}$), arsenate ($As^{5+}$), arsine ($As^{3-}$) and elemental arsenic (As)

Figure 1:
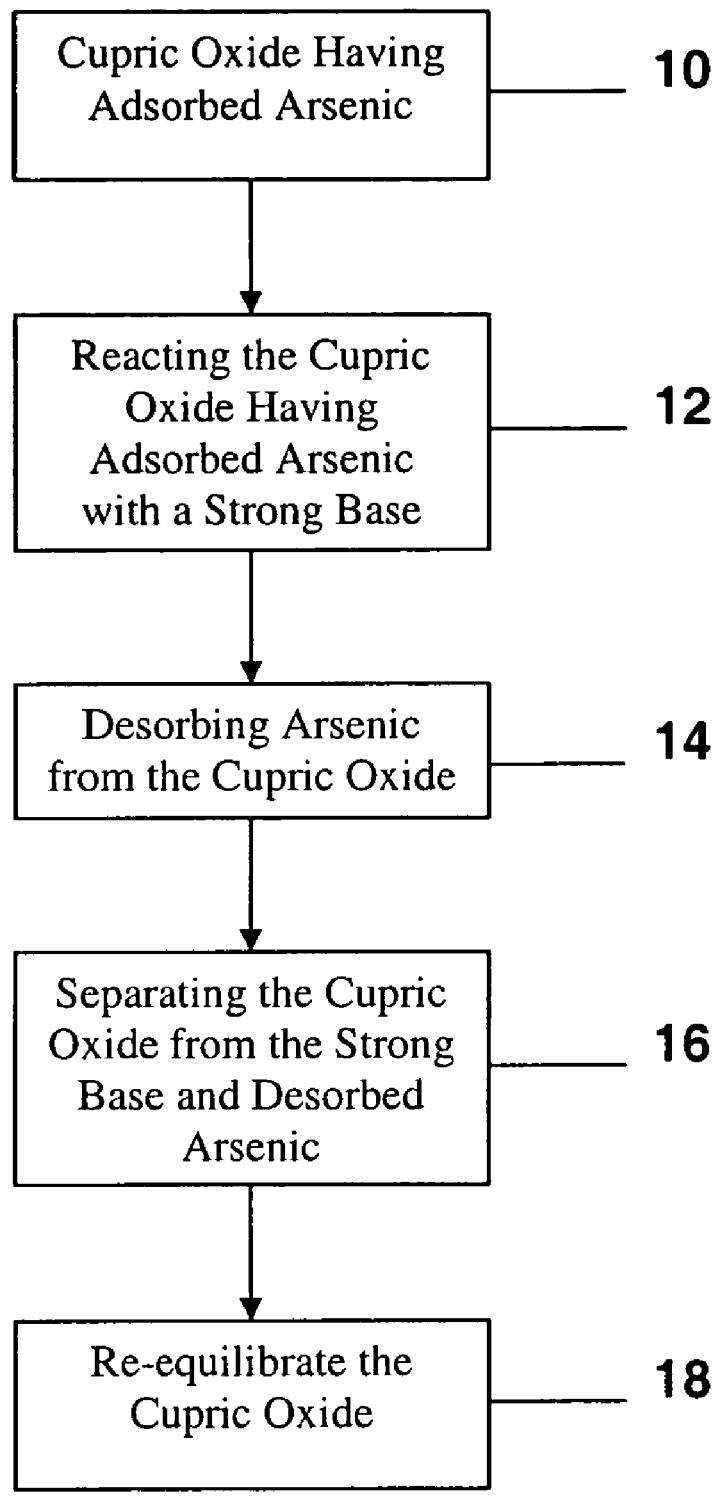
FIG. 1 is a flow chart illustrating one process for the rejuvenation of cupric oxide having adsorbed arsenic for reuse in accordance with the present invention.

With reference to FIG. 1, in one process cupric oxide having adsorbed arsenic from arsenic contaminated water may be rejuvenated and recycled to again react with and adsorb arsenic in contaminated water.

In this process cupric oxide has reacted with adsorbed arsenic (Step 10). To rejuvenate the cupric oxide, the cupric oxide is separated from the adsorbed arsenic. Arsenic adsorption to cupric oxide appears to be a pH dependant reaction that is optimal from a pH of about 6 to 9. Natural influents of arsenic contaminated water typically fall within this pH range without needing pH adjustment.

Conversely, at an elevated pH arsenic adsorption by cupric oxide decreases. At elevated pH levels protons dissociate from the arsenic and the arsenic's ability to react with the cupric oxide is reduced. This increases arsenic mobility and causes arsenic to desorb from the cupric oxide under certain conditions greater than a pH of about 9.

The cupric oxide having adsorbed arsenic is reacted with a strong base such as sodium hydroxide (Step 12). This elevates the pH and causes the arsenic to desorb from the cupric oxide (Step 14).

Following desorption of the arsenic, the cupric oxide is separated from the strong base and arsenic (Step 16). The cupric oxide may be separated by conventional means, including filtration, flocculating, settling, skimming, vortexing, centrifugation, magnetic separation, or other well-known separation systems.

The separated cupric oxide may be alkaline from the desorption reaction with the strong base. Alkaline cupric oxide may not be effective for recycling to again react with and adsorb arsenic from contaminated water. The cupric oxide may be prepared for effective recycling by re-equilibrating the cupric oxide to a pH of about 7 (Step 18). In one process the cupric oxide may be simply and economically re-equilibrated by washing the cupric oxide with arsenic-free water until the pH reaches about 7.

The re-equilibrated cupric oxide may then be dried, resulting in rejuvenated cupric oxide effective for recycling to again react with and adsorb arsenic in contaminated water.

In one process the strong base utilized to desorb the arsenic from the cupric oxide may be selected from group IA or IIA alkaline hydroxides such as sodium hydroxide, potassium hydroxide, lithium hydroxide, magnesium hydroxide, calcium hydroxide, rubidium hydroxide, cesium hydroxide, strontium hydroxide, barium hydroxide and aluminum hydroxide.

The process or method for rejuvenating or cupric oxide is particularly useful in a process or method for purifying water having arsenic. As explained below, cupric oxide can be utilized to remove arsenic from water. Over time the effectiveness of the cupric oxide decreases due to the content of adsorbed arsenic. Hence, the cupric oxide can be rejuvenated according to the process described above and the rejuvenated cupric oxide can be recycled and used in the water treatment process.

Figure 2:
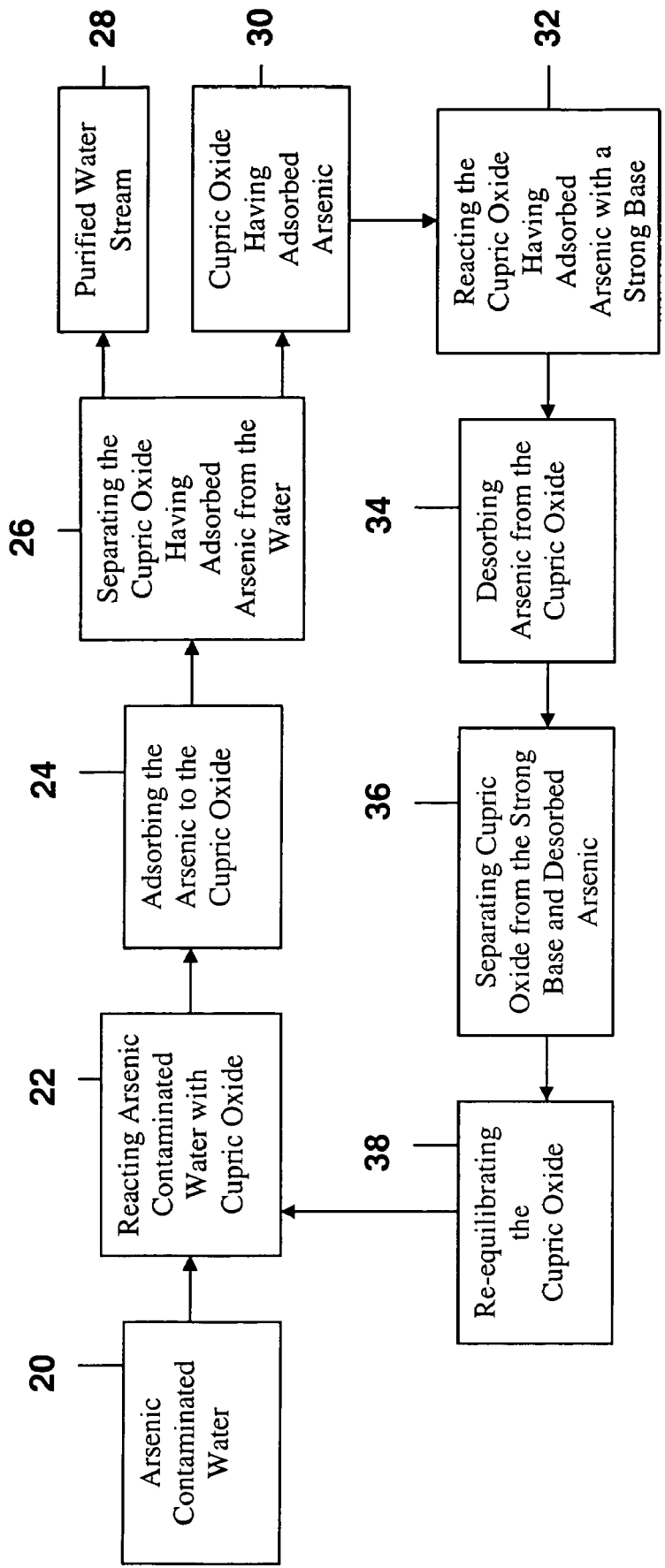
FIG. 2 is a flow chart illustrating a process that utilizes cupric oxide to remove arsenic from water.

A schematic of a process for treating arsenic contaminated water is illustrated in FIG. 2. Arsenic contaminated water (Step 20) is reacted with insoluble particles of cupric oxide (Step 22). Contact between the cupric oxide and the arsenic containing water stream is maintained for a time period sufficient for the arsenic to be bound to the cupric oxide by adsorption (Step 24).

Arsenic adsorption to cupric oxide appears to be a pH dependant reaction that is optimal from a pH of about 6 to 9. Natural influents of arsenic contaminated water typically fall within this pH range without needing pH adjustment. The adsorption of arsenic is accompanied by the uptake of protons. Arsenic adsorption to cupric oxide is usually quite rapid. The length of time required for adsorption of the desired quantity of arsenic is dependent on a variety of factors, including pH and temperature of the water, quantity of arsenic present in the water and quantity of competing ions present in the water.

Following reacting the particles of cupric oxide with the arsenic contaminated water for the desired time, the water may be directed to a separator where the cupric oxide having adsorbed arsenic may be separated from the water (Step 26).

The cupric oxide having adsorbed arsenic may be separated from the water by conventional means, including filtration, flocculating, settling, skimming, vortexing, centrifugation, magnetic separation, or other well-known separation systems. The result of separation is a purified water stream without arsenic (Step 28) and a waste stream of cupric oxide having adsorbed arsenic (Step 30). The purified water stream may need to be deionized, re-equilibrated or further treated before being potable.

The waste stream of cupric oxide having adsorbed arsenic may be rejuvenated and recycled to again react with and adsorb arsenic in contaminated water. To rejuvenate the cupric oxide, the cupric oxide is separated from the adsorbed cupric oxide. As described above, arsenic adsorption to cupric oxide appears to be optimal between a pH from about 6 to 9. Conversely, at an elevated pH arsenic adsorption to cupric oxide decreases. At elevated pH levels protons dissociate from the arsenic and the arsenic's ability to react with the cupric oxide is reduced. This increases arsenic mobility and causes arsenic to desorb from the cupric oxide under certain conditions greater than a pH of about 9.

As discussed above, to rejuvenate the cupric oxide, (Step 30) a strong base such as sodium hydroxide is reacted with the cupric oxide. (Step 32). This elevates the pH and causes the arsenic to desorb from the cupric oxide (Step 34). Following adsorption of the arsenic, the cupric oxide is separated from the strong base and arsenic (Step 36) by the separation techniques described above.

The separated cupric oxide may be alkaline from the desorption reaction with the strong base. Alkaline cupric oxide may not be effective for recycling to again react with and adsorb arsenic from arsenic contaminated water. The cupric oxide may be prepared for recycling by re-equilibrating the cupric oxide to a pH of about 7 (Step 38). In one process the cupric oxide may simply be re-equilibrated by washing the cupric oxide with arsenic-free water until the pH reaches about 7. The re-equilibrated cupric oxide may then be dried, resulting in a rejuvenated cupric oxide capable for recycling (Step 22)

EXAMPLE 1

In one example fifty milliliter liquids having arsenic standards between 50 and 150 micrograms per liter (µg/L) were reacted with 0.5 grams of cupric oxide particles. The liquids were then centrifuged to separate the cupric oxide particles having adsorbed arsenic. The resultant supernatant was removed, filtered and analyzed for arsenic to determine an arsenic adsorption rate.

The cupric oxide particles having adsorbed arsenic were reacted with 49 ml of sodium hydroxide having a pH of approximately 12.75. The mixture was then centrifuged. The sodium hydroxide-arsenic solution was removed, filtered and analyzed for arsenic to determine arsenic desorption rate. Table 1 illustrates the recorded data.

contaminated water resulted in 97.88% of the arsenic being absorbed by the cupric oxide. In the case of Sample 2, after the cupric oxide was added to the contaminated water, it was determined that 98.59% of the arsenic in the water was absorbed by the cupric oxide. In both cases, the cupric oxide with the absorbed arsenic was separated from the purified liquid or water. In each case the separated cupric oxide having absorbed arsenic was reacted with a strong base, which in this case was sodium hydroxide. In the case of the first sample of cupric oxide-arsenic, the treatment of the sample with the sodium hydroxide resulted in 95.59% of the arsenic being desorbed or removed from the cupric oxide. In the case of Sample No. 2, 90.51% of the arsenic was desorbed or removed from the cupric oxide.

The data suggests that cupric oxide particles are efficient in adsorption of arsenic from water. Cupric oxide may also rejuvenate very efficiently by desorbing arsenic by reaction with a strong base such as sodium hydroxide. The rejuvenated cupric oxide may be re-equilibrated until reaching a pH of about 7. The re-equilibrated cupric oxide may be recycled to again react with and adsorb arsenic from arsenic contaminated water.

The ability to rejuvenate and recycle cupric oxide to remove arsenic from contaminated water significantly lowers the cost of operating a water treatment system utilizing cupric oxide in an arsenic removal process. One specific system is described in International Publication No.: WO2005/028736, the disclosure of which is incorporated herein by reference.

Although the process of the invention is primarily envisioned for removing dissolved arsenic from drinking water and groundwater, it will be understood that the process can be used to treat any water or water stream that contains undesirable amounts of arsenic. Examples of such water streams include, among others, well waters, surface waters, such as water from lakes, ponds and wetlands, agricultural waters, wastewater from industrial processes, and geothermal fluids.

The present invention may be carried out in other specific ways than those herein set forth without departing from the scope and essential characteristics of the invention. The present embodiments are, therefore, to be considered in all respects as illustrative and not restrictive, and all changes coming within the meaning and equivalency range of the appended claims are intended to be embraced therein.

TABLE 1

| Liquid Sample | pH of the Liquid Sample Before Treatment with CuO | Arsenic Concentration in the Liquid Sample Before Treatment with CuO (µg/L) | pH of the Liquid Sample After Treatment with CuO | Arsenic Concentration in the Liquid Sample After Treatment with CuO (µg/L) | Arsenic Adsorbed (%) |
|---|---|---|---|---|---|
| 1 | 8.04 | 56.8 | 7.86 | 1.2 | 97.88 |
| 2 | 8.43 | 142.3 | 8.22 | 2.0 | 98.59 |

| CuO-As from the Sample | Concentration of Total Dissolved Cu Before Addition of the Strong Base (µg/L) | Concentration of Total Dissolved Cu After Addition of the Strong Base (µg/L) | Concentration of Arsenic Desorbed (µg/L) | Arsenic Desorbed (%) |
|---|---|---|---|---|
| 1 | 12.8 | 144 | 54.3 | 95.59 |
| 2 | 36.5 | 136.5 | 128.8 | 90.51 |

Briefly reviewing Table 1, it is seen that two samples of the arsenic contaminated water or liquid was tested. In the case of Sample 1, the addition of cupric oxide to the

What is claimed is:

1. A method of rejuvenating cupric oxide having adsorbed arsenic, the method comprising the steps of:

reacting the cupric oxide having adsorbed arsenic with a strong base and desorbing the arsenic from the cupric oxide; and separating the cupric oxide from the strong base and arsenic.

2. The method of claim 1 further comprising the step of reacting the cupric oxide with arsenic contained in a water stream.

3. The method of claim 1 wherein the strong base is selected from the group consisting of sodium hydroxide, potassium hydroxide, lithium hydroxide, magnesium hydroxide, calcium hydroxide, rubidium hydroxide, cesium hydroxide, strontium hydroxide, barium hydroxide and aluminum hydroxide.

4. The method of claim 1 wherein the strong base is sodium hydroxide.

5. The method of claim 1 wherein the strong base has a pH of at least 12.

6. The method of claim 1 wherein the cupric oxide is re-equilibrated by washing the cupric oxide with arsenic-free water.

7. The method of claim 6 further comprising the step of drying the cupric oxide.

8. The method of rejuvenating cupric oxide of claim 1 including after desorbing the arsenic from the cupric oxide and separating the cupric oxide from the strong base and arsenic, re-equilibrating the cupric oxide.

9. The method of claim 8 wherein the cupric oxide is re-equilibrated to a pH of about 7.

10. A method of removing arsenic from water, comprising the steps of:

reacting cupric oxide with arsenic contaminated water, wherein the reaction results in the cupric oxide adsorbing arsenic in the water;

separating the cupric oxide having adsorbed arsenic from the water;

reacting the cupric oxide having adsorbed arsenic with a strong base and desorbing the arsenic from the cupric oxide; and separating the cupric oxide from the strong base and arsenic.

11. The method of claim 10 further comprising the step of recycling the cupric oxide by reacting the cupric oxide with arsenic contaminated water.

12. The method of claim 10 wherein the strong base is selected from the group consisting of sodium hydroxide, potassium hydroxide, lithium hydroxide, magnesium hydroxide, calcium hydroxide, rubidium hydroxide, cesium hydroxide, strontium hydroxide, barium hydroxide and aluminum hydroxide.

13. The method of claim 10 wherein the strong base is sodium hydroxide.

14. The method of claim 10 wherein the strong base has a pH of at least 12.

15. The method of claim 10 wherein the cupric oxide is re-equilibrated by washing the cupric oxide with water.

16. The method of claim 15 further comprising the step of drying the cupric oxide.

17. The method of claim 10 wherein after the cupric oxide has been separated from the strong base and arsenic, re-equilibrating the cupric oxide.

18. The method of claim 17 wherein the cupric oxide is re-equilibrated to a pH of about 7.

* * * * *